United States Patent
Kamdar et al.

(10) Patent No.: US 7,698,639 B2
(45) Date of Patent: Apr. 13, 2010

(54) EXTENSIBLE FRAMEWORK FOR TEMPLATE-BASED USER SETTINGS MANAGEMENT

(75) Inventors: Nirav Kamdar, Redmond, WA (US); Deepak Rao, Bellevue, WA (US); Bimal K. Mehta, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 278 days.

(21) Appl. No.: 11/638,070

(22) Filed: Dec. 13, 2006

(65) Prior Publication Data

US 2008/0148157 A1  Jun. 19, 2008

(51) Int. Cl.
G06F 15/00 (2006.01)
G06F 13/00 (2006.01)
(52) U.S. Cl. ..................... 715/505; 715/906
(58) Field of Classification Search ................ 715/505, 715/906, 763–765, 853–855, 705, 517, 243; 709/203, 209
See application file for complete search history.

(56) References Cited

U.S. PATENT DOCUMENTS

| | | | |
|---|---|---|---|
| 5,872,928 | A | 2/1999 | Lewis et al. |
| 6,466,932 | B1 | 10/2002 | Dennis et al. |
| 7,096,258 | B2 | 8/2006 | Hunt et al. |
| 7,441,187 | B2 * | 10/2008 | Meadows .................. 715/243 |
| 2003/0041139 | A1 | 2/2003 | Beadles et al. |
| 2003/0081621 | A1 | 5/2003 | Godfrey et al. |
| 2004/0003279 | A1 | 1/2004 | Beilinson et al. |
| 2004/0064196 | A1 | 4/2004 | Furutono et al. |
| 2004/0204949 | A1 | 10/2004 | Shaji et al. |
| 2004/0215650 | A1 | 10/2004 | Shaji et al. |
| 2005/0160159 | A1 * | 7/2005 | Zimmer et al. ............. 709/223 |
| 2006/0174320 | A1 | 8/2006 | Maru et al. |
| 2006/0195575 | A1 * | 8/2006 | Delany et al. ............... 709/225 |

OTHER PUBLICATIONS

Lewis, L., "Implementing policy in enterprise networks", Date: Jan. 1996, pp. 50-55, vol. 34, Issue: 1, http://ieeexplore.ieee.org/xpl/freeabs_all.jsp?arnumber=482244.

Lymberopoulos, et al., "An Adaptive Policy-Based Framework for Network Services Management", Date: Sep. 2003, vol. 11, No. 3, http://www.doc.ic.ac.uk/~mss/Papers/Lymberopoulos-JNSM-09-03.pdf.

* cited by examiner

Primary Examiner—Cao "Kevin" Nguyen

(57) ABSTRACT

Extensible architecture for template-baser user setting management by creating logical groupings of per-user settings using different template types. A manageable way to assign templates to sets of users based on different criteria is provided. Templates can be defined in a declarative format (e.g., XML), which declarative format is developed such that various user interface (UI) pieces, third-party applications, and different client types can easily understand the templates. Extensibility of the architecture is supported for defining the templates such that external third-party application writers can make use of the provided infrastructure to add to existing templates or create new template types, and to seamlessly integrate into the existing infrastructure. Additionally, the per-user settings within the templates can be enforced on the server side, including the enforcement of future settings and template types.

18 Claims, 16 Drawing Sheets

EXTENSIBLE FRAMEWORK FOR TEMPLATE-BASED USER SETTINGS MANAGEMENT

BACKGROUND

Most client/server applications should have a method to apply configuration settings to individual users that use the client to interact with the server. Such settings can be referred to as "per-user" settings. These settings are typically set by the system administrator for individual users. The users can be represented in an enterprise as objects in a user store. For example, in one conventional implementation, a "user object" is generated for each user in the enterprise.

Conventionally, there are a number of ways that these settings can be configured and applied on a per-user basis. One such method is the use of global policies that are pushed to individual clients and then enforced at the client level. However, this method has several disadvantages. Pushing such policies to every user is very difficult to fully solve and to manage, and can also require a software agent to facilitate the arrangement. Furthermore, since enforcement is on the client, a rogue client can be generated that completely bypasses these policies. Finally, pushing such policies across firewalls on non-enterprise devices is an exceedingly difficult problem to solve. Another method is to apply the per-user settings on the server side on every user object. This would, however, cause to a large amount of data to be applied to every user object in the enterprise and would quickly lead to a management nightmare as the number of settings increase.

Another disadvantage of the conventional approaches is that all aspects of the actual settings are shipped when the client/server system is shipped. The list of settings, the way to enforce the settings, and the way to display the settings to the administrator for modification, for example, are tightly coupled to the product code and shipped with the product. In other words, there is usually no mechanism for enhancements or additions to this setting list for the product developer after the product is shipped. Thus, if a new setting needs to be added a new version of the server would need to be shipped and all customers that need this setting would need to perform a system upgrade.

Yet another disadvantage with conventional implementations is that there is more or less no consistent way for such third party vendors to plug-in per-user settings to the server system such that the settings can be displayed to the administrator and enforced in the same way as the remaining settings that were actually shipped with the server. Consequently, the administrator will not obtain an integrated experience for managing the per-user settings for the server and third-party applications.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The disclosed architecture is a mechanism for creating logical groupings of per-user settings using different template types. A manageable way to assign templates to sets of users based on different criteria is provided. Templates can be defined in a declarative format (e.g., XML-extensible markup language), which declarative format is developed such that various user interface (UI) pieces, third-party applications, and different client types can easily understand the templates. Extensibility of the architecture is supported for defining the templates such that external third-party application writers can make use of the provided infrastructure to add to existing templates or create new template types, and to seamlessly integrate into the existing infrastructure. Additionally, the per-user settings within the templates can be enforced on the server side, including the enforcement of future settings and template types.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
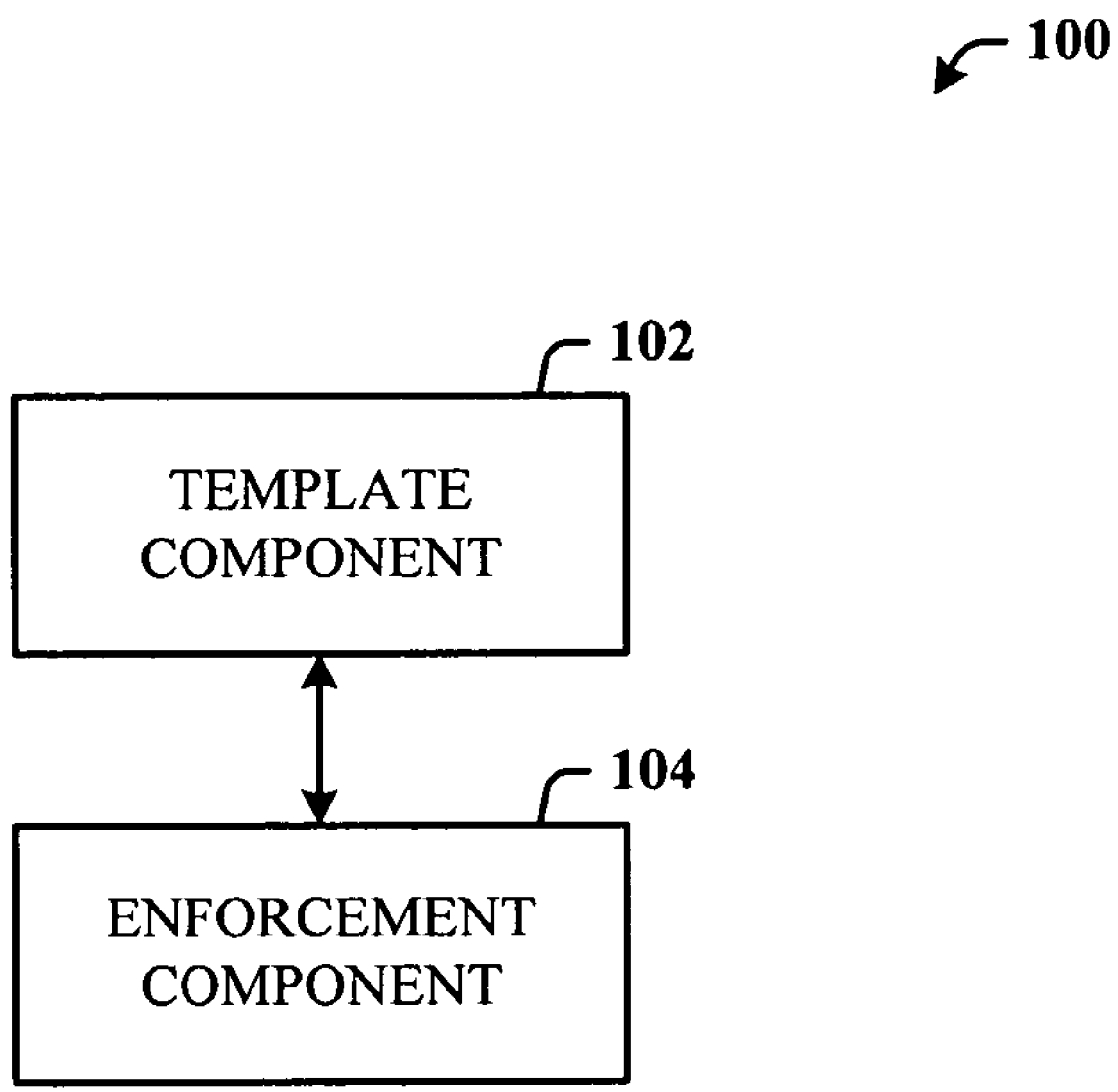
FIG. 1 illustrates a system that facilitates configuration management in accordance with the innovation.

The innovation provides a mechanism of grouping per-user settings into logical units called "templates", utilizes a declarative format for defining a template and, describes how templates can be stored, managed, assigned to users and enforced on the server side. Because the content of the template is expressed in a declarative format, the templates are extensible. Moreover, the innovation provides the capability to decouple the per-user setting definition and enforcement from the actual product code. As a result, new settings can be added to existing templates after the product has shipped. Similarly, altogether new template types can be added to the system after the product has shipped.

Another advantage is that templates that are shipped when the server ships, for example, actually have a provision to take on additional settings of which the server is unaware. As a result, external third-party application writers can make use of this extensibility to provide custom settings in existing template types which can be viewed by the administrator as a part of the product. The administrator is thus provided with a consistent view and may not even know that different parts of the templates were provided by different companies at different times.

The innovation also includes a way to assign the templates to groups of users, which is a common problem in the conventional enterprise server world. Accordingly, a single template can be assigned to each user in the system and/or users can be grouped into different units and different templates applied to the different units.

The innovation will now be described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

Referring initially to the drawings, FIG. 1 illustrates a system 100 that facilitates configuration management in accordance with the innovation. The system 100 can include a template component 102 for defining a per-user setting as a template, and an enforcement component 104 for enforcing the per-user setting via the template. The system 100 can be employed as a server, wherein the enforcement component 104 enforces the per-user setting from the server. The per-user setting can be defined as a logical grouping, and the grouping can further be associated with different categories such as a category of employee, geography, user location or network characteristic, for example. Extensibility is provided by defining a template in a declarative format (e.g., XML-extensible markup language).

In other words, the system 100 provides a mechanism for creating logical groupings of per-user settings into different template types, and a manageable way to assign the templates to sets of users based on different criteria. Templates are defined in a declarative format such that various user interface (UI) pieces, third-party applications and different client types can easily understand and use the templates. Extensibility allows third-party application writers can make use of the provided infrastructure to add to existing templates or create new template types and seamlessly integrate into the existing infrastructure. The per-user settings within the templates can be enforced on the server side, including the enforcement of future settings and template types.

Settings applied to individual users in a client-server system are referred to as "per-user settings" in this document. Such per-user settings are categorized into different logical groups. These categorizations can then be referred to as "setting template" or simply "template". A template is then instantiated as many times as needed. Each instance would have actual values for the settings in the instance. Individual instances are then assigned to users or groups of users.

Figure 2:
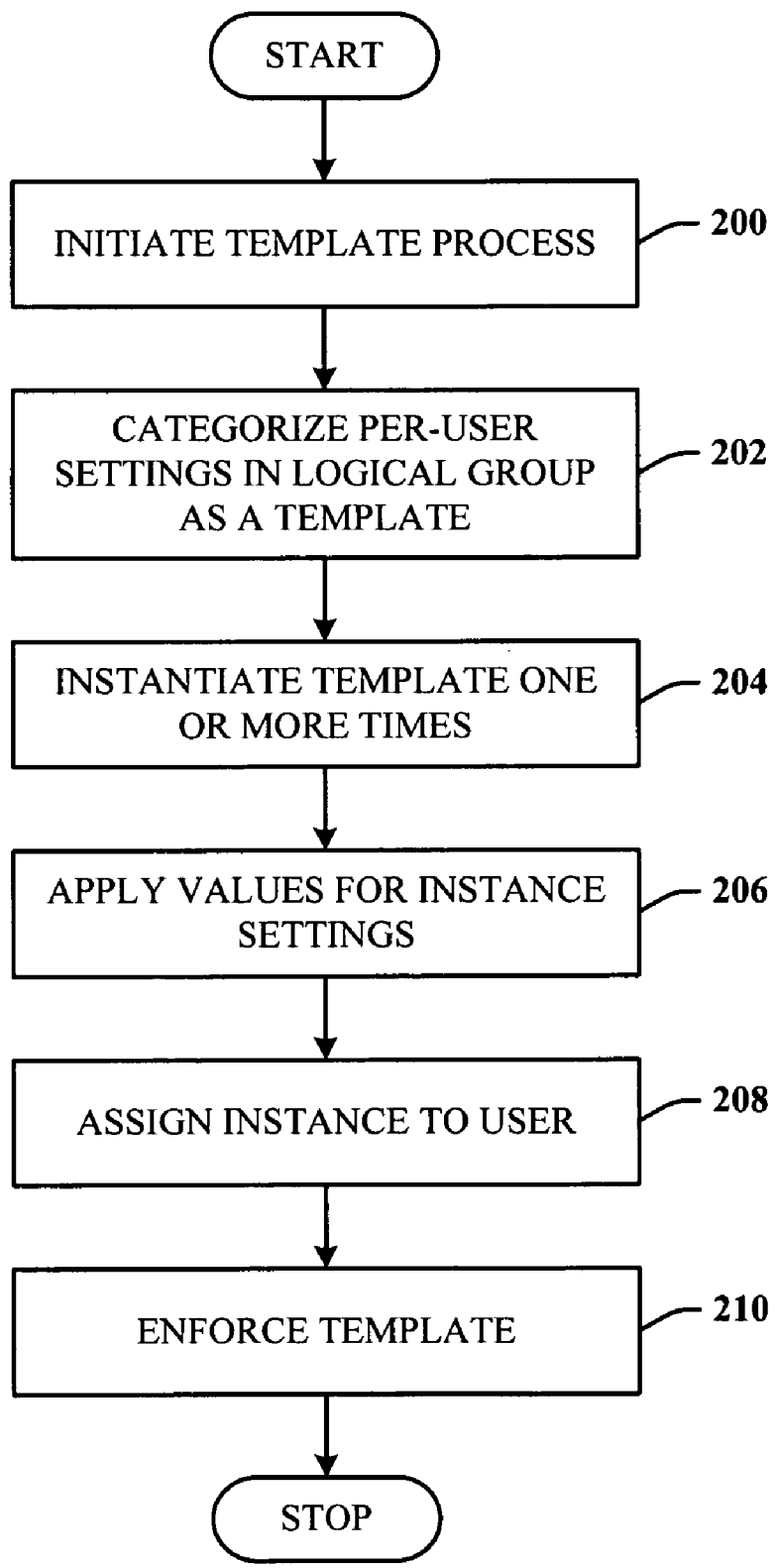
FIG. 2 illustrates a methodology of managing settings via templates.

Accordingly, FIG. 2 illustrates a methodology of managing settings via templates. While, for purposes of simplicity of explanation, the one or more methodologies shown herein, for example, in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, a template process is initiated. At 202, per-user settings are categorized in a logical group and organized as a template. At 204, the template is instantiated one or more times to create template instances. At 206, values are applied to the template instance settings. At 208, one or more of the instances are assigned to a user. At 210, the template is then enforced (e.g., on the server side).

There can be multiple types of templates, and each template type includes a definition and one or more instances. For example, a communications server can have the following two template types:

Template Type: Policy Template
Template settings: AllowIPVideo, AllowAdhocScheduling, AllowApplicationSharing
Template Type: Bandwidth Template
Template settings: MaximumSizeOfFileThatCanBeTransferred, AllowEnhancedIPVideo Next, instances can be created of each of these template types. For example, the instances of the Policy Template (PT) can include:

PT1 {AllowIPVideo=True, AllowAdhocScheduling =True, AllowApplicationSharing=True}
PT2 {AllowIPVideo=True, AllowAdhocScheduling =False, AllowApplicationSharing=False}

Exemplary instances of the Bandwidth Template (BT) can include:

BT1{MaximumSizeOfFileThatCanBeTransferred=1000, AllowEnhancedIPVideo=True}
BT2{MaximumSizeOfFileThatCanBeTransferred= 500, AllowEnhancedIPVideo=False}
BT3{MaximumSizeOfFileThatCanBeTransferred= 100, AllowEnhancedIPVideo=False}

Figure 3:
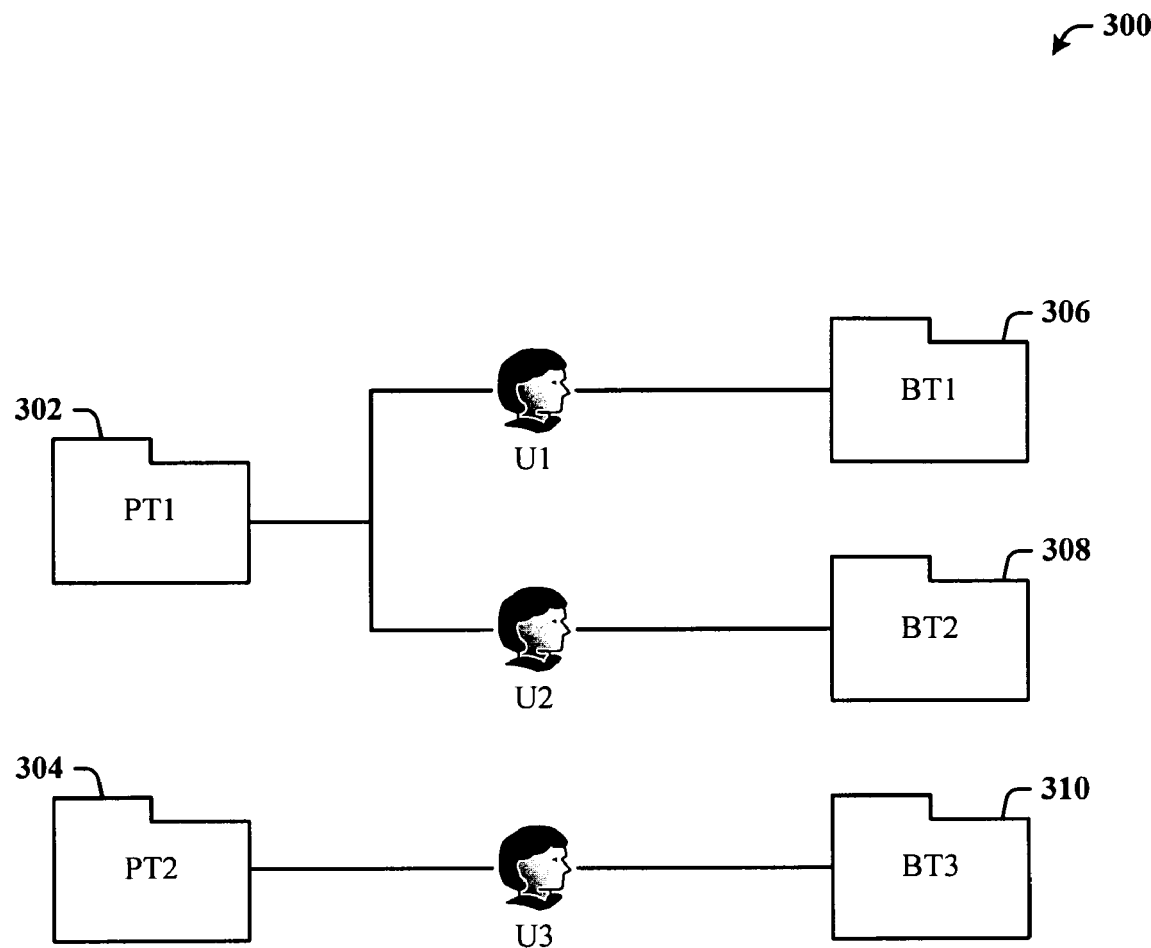
FIG. 3 illustrates application of the bandwidth templates and policy templates to users of a system.

FIG. 3 illustrates application of the bandwidth templates and policy templates to users of a system 300. Assume there are three users U1, U2, U3 in the system 300 and each of the users is then assigned an instance of the policy template and an instance of the bandwidth template. For example, u1 is assigned PT1 and BT1
u2 is assigned PT1 and BT2
u3 is assigned PT2 and BT3.

Here, a first policy template instance (PT1) 302 is assigned to users U1 and U2, and a second policy template (PT2) 304 is assigned to the third user U3. Additionally, each user is assigned different bandwidth templates. For example, user U1 is assigned a first bandwidth template instance (BT1) 306, user U2 is assigned a second bandwidth template instance (BT2) 308, and user U3 is assigned a third bandwidth template instance (BT3) 310. Thus, users U1 and U2 are grouped for the first policy template 302, yet have individual bandwidth template instance assignments (306 and 308, respectively). User U3 receives individual template instance assignments for policy 304 and bandwidth 310.

The individual settings in the templates can then be enforced on the server side. Note that by grouping settings into buckets, it is no longer required to change every setting for every user. Logical instances of the templates are created first and then the instances are assigned to users.

Templates types can be created depending on the system application. For example, in one exemplary system, the following four template types can be created:

1. Policy Template type: contains settings that are related to features that a user can or cannot use. In the above example, there are three settings related to policies allowing the user to use, for example, IP video, a scheduler to schedule ad hoc conferences, and application sharing for the sharing of applications. In addition, there can be other settings, for example, allowing the user to use certain features such as meeting recording, or the maximum number of participants that a user can invite, etc.

2. Bandwidth Template type: contains settings that are related to bandwidth. In the above example, there are two settings that in this particular template set the maximum size of file transfers that can be initiated by a user, and allow the user to use an enhanced version of IP video which can be more bandwidth accommodating for communicating the larger file size (e.g., 1000).

3. Topology Discovery Template type: contains settings that could help the user (or the client running on user's behalf) to discover various elements in the system. For example, this can contain the server to which the client should communicate for conferencing, the server to which the client should send quality-of-service (QoS) metrics, the server in a DMZ (demilitarized zone—an area just outside a firewall) that can tunnel traffic in and out of the network, etc.

4. Security Template type: contains settings that are related to the system security. For example, this can include settings such as disabling client-side APIs (application program interfaces), maximum size of bytes that a client can send (to avoid SPAM), etc. Note that the above template types are just a few examples of the many template types that can be created and employed.

Template instances can be stored in a data store that is accessible to the servers of the system. The template instances can be stored as generic XML. This makes the template definition generic and the template instance agnostic of the actual settings the template contains. In one example, an XSD (XML schema definition) schema can be defined for each template type so that the template definition can be verified against the schema. For example, instances of the bandwidth template type described above can be defined as follows:

```
<TemplateInstance templateType="BandWidth" Name="BT1">
  <property name="MaximumSizeOfFileThatCanBeTransferred"
component="DataMCU"> 1000 </property>
  <property name="AllowEnhancedIPVideo" component="AVMCU">
  true
</property>
</TemplateInstance>
```

-continued

```
<TemplateInstance templateType="BandWidth" Name="BT2">
  <property name="MaximumSizeOfFileThatCanBeTransferred"
component="DataMCU"> 500 </property>
  <property name="AllowEnhancedIPVideo" component="AVMCU">
  false
</property>
</TemplateInstance>
```

Figure 4:
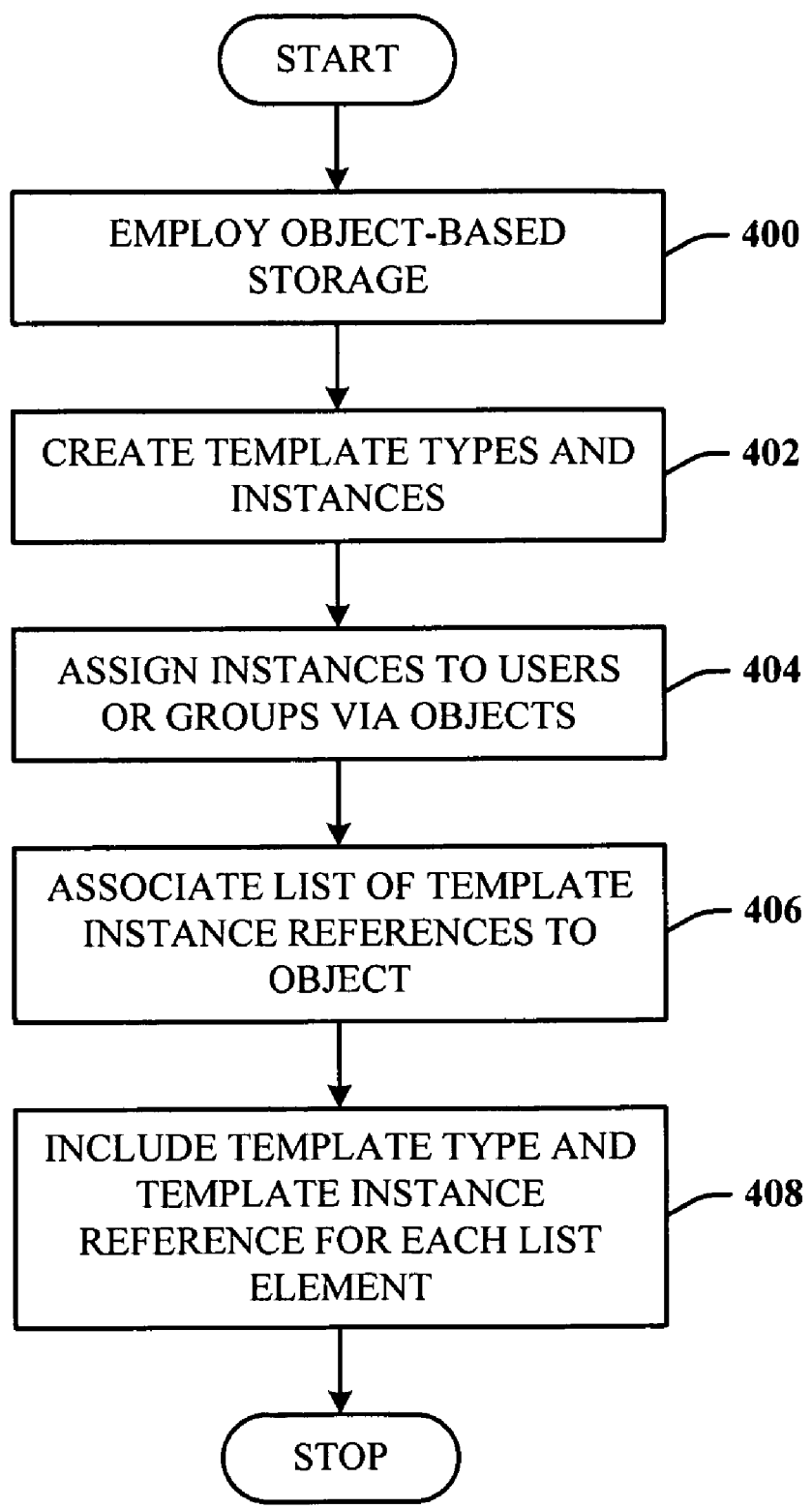
FIG. 4 illustrates a methodology associating templates with objects and template lists.

Thus, the administrator can choose to create as many instances of each template type as desired. FIG. 4 illustrates a methodology associating templates with objects and template lists. At 400, an object-based storage schema is employed. At 402, template types and template instances for the template types are created. At 404, the template instances are assigned to individual users or groups of users using the object(s) (e.g., user objects). To keep this assignment as generic as possible, each object (e.g., user object) can include a list of template instance references, as indicated at 406. At 408, each element in this list can contain a reference to a template instance and an indicator of the type of the template from which the instance is instantiated. For example, in one communications server implementation, the template instance list is stored on a user object as a multi-valued attribute of type DN (distinguished name)-with-binary (DN is similar to a pointer). Individual elements of this list can then contain a template type and a template instance reference. An alternative implementation applies an access control list (ACL) on the template objects. The ACL will then dictate access to the particular template.

To simplify management, the users may be grouped into different groups (e.g., organizational units, security groups) and then templates can be assigned to these groups. Internally, the tool that does this template assignment can set the template instance references on a per-user basis or can create user groupings. Each such user grouping can have a group object representing the group, and template references can be assigned to that group object.

Figure 5:
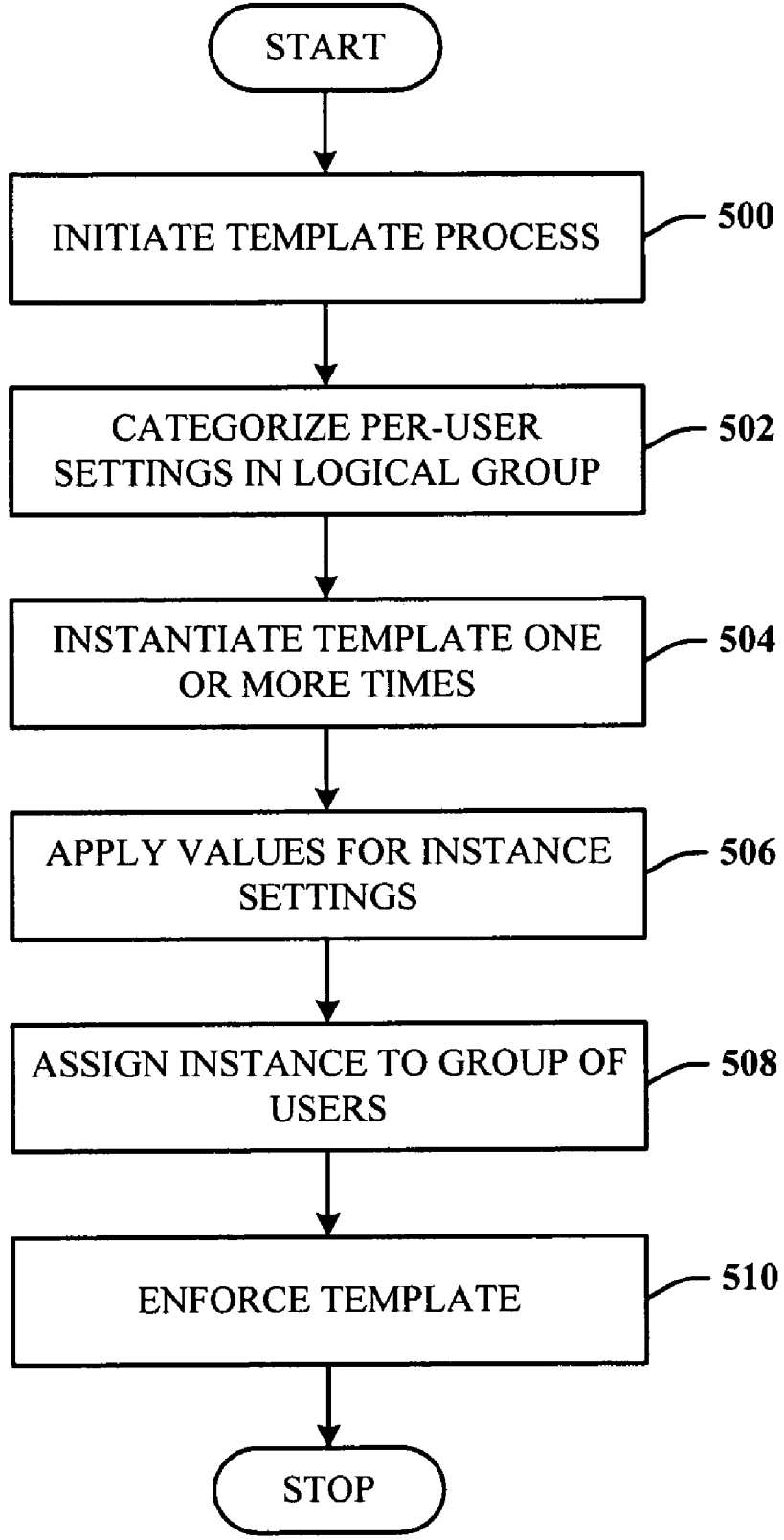
FIG. 5 illustrates a methodology of utilizing templates for group assignments.

Accordingly, FIG. 5 illustrates a methodology of utilizing templates for group assignments. At 500, a template process is initiated. At 502, per-user settings are categorized into logical groups. At 504, the template is instantiated one or more times, as desired. At 506, values can be applied for instance settings. At 508, an instance can be assigned to a group of users. At 510, the template(s) are enforced on the sever side.

There can be different user groupings based on the environment and the needs of an enterprise. Some examples of user groupings include the following.

1. By categories of workers: executives in an enterprise can be assigned templates that provide a richer feature set and the more bandwidth intensive features, etc. Similarly, employees working in a marketing department can be assigned template instances that allow inviting external anonymous participants to meetings. However, engineers may not have a need to interact with customers and so could be assigned template instances that restrict the engineers from inviting external participants to meetings.

2. By geography: this is especially beneficial for geographically dispersed companies. Users in different geographical locations can be assigned different topology discovery template instances for locating and communicating to servers suitable for that locale.

3. By user location: depending on whether a user logs into a server from outside the corporate network or inside the corporate network, the user can be assigned a different template instance. For example, users logging in from outside the enterprise can be assigned more stringent security settings than users logging in from inside the company.

4. By network characteristics: another way can be to differentiate users by the characteristics of the network in the sites to which the users belong. For example, users who are located in sites operating under more restrictive network bandwidth can be assigned the lesser bandwidth intensive template instances than users located in sites with fat (or higher bandwidth capable) network pipes.

Another disclosed management simplification is implementation of a global setting (e.g., per enterprise, per site in the enterprise) that holds a template instance reference. In other words, if a user does not have a template instance assigned, then the user can be configured to automatically inherit the global template instance. By providing this capability, it becomes easy to assign a particular template to all users in the enterprise or an enterprise site. This global capability supports an out-of-box default configuration for company users after product installation. Thereafter, as the administrator becomes more familiar with the product features, the administrator can choose to create other instances and instance assignments for individual users and/or user groups. Note that this description is for a particular template type. In a practical implementation, there can be a list of global settings that contains references to an instance of each template type (e.g., similar to the list of template instance references on the user level).

Figure 6:
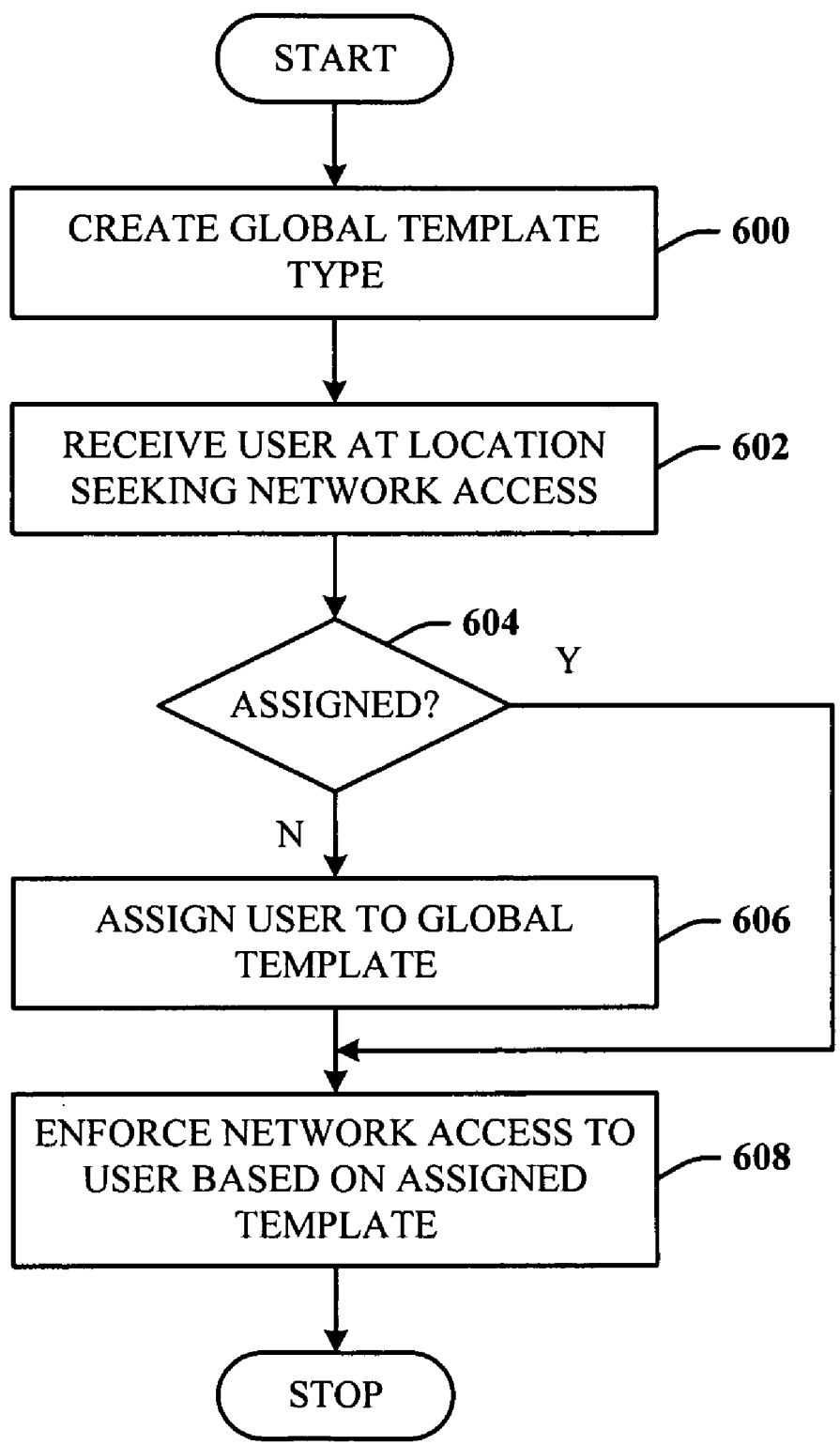
FIG. 6 illustrates a methodology of creating and utilizing a global template.

FIG. 6 illustrates a methodology of creating and utilizing a global template. At 600, a global template type is created. At 602, a user is received at a location seeking network access. This can be where a new employee has been hired or an existing employee travels to a different corporate location and needs network access. At 604, a check is performed to determine if the user has been assigned a template. If not, at 606, the user is assigned a global template instance. The network then enforces the template to manage user access to the network (and associated network resources). If the user already has an assigned template instance, flow is from 604 to 608 to again, enforce network access based on the already-assigned template instance.

Figure 7:
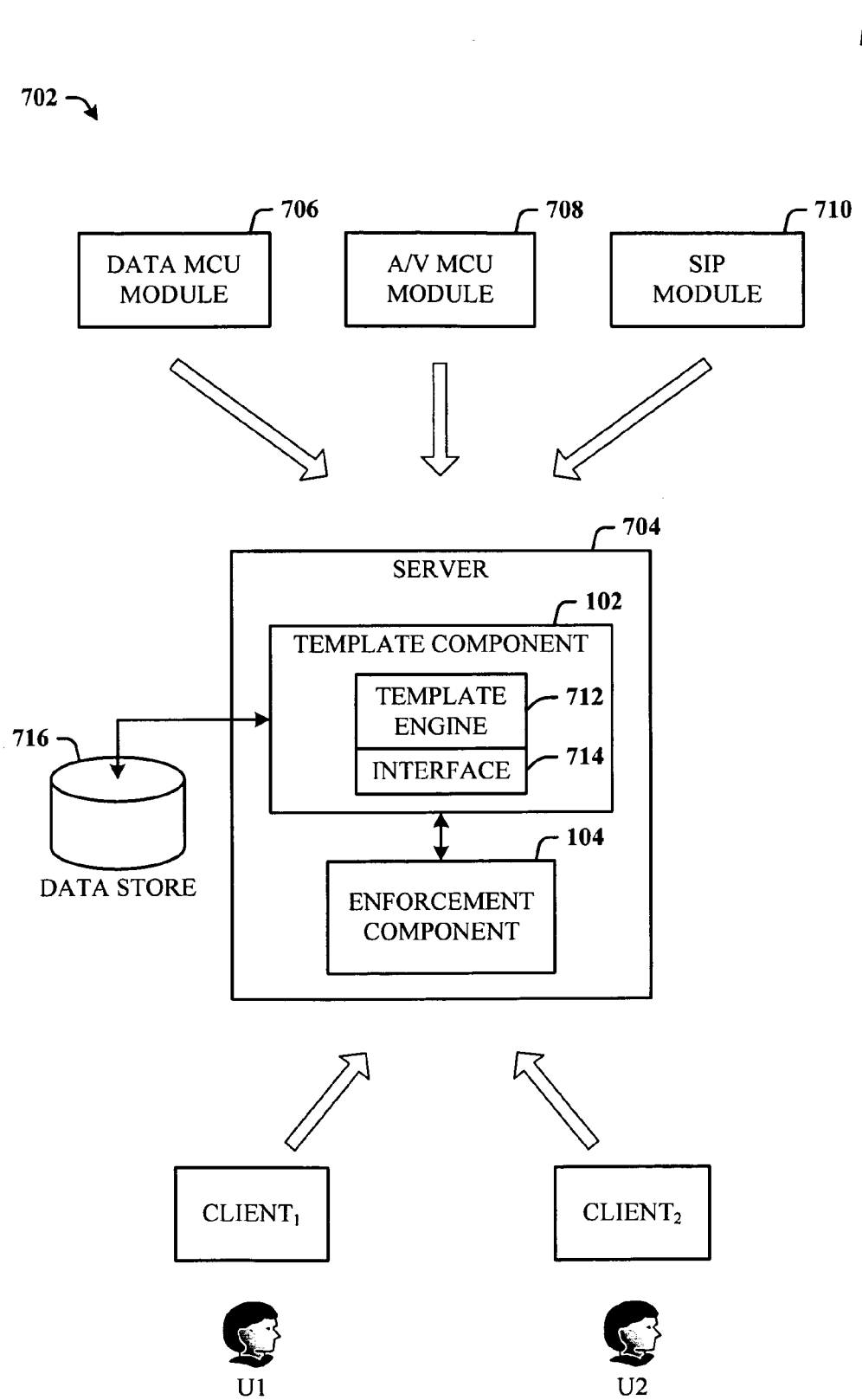
FIG. 7 illustrates a server system that includes different components or modules for template processing in accordance with the innovation.

FIG. 7 illustrates a server system 700 that includes different components or modules for template processing in accordance with the innovation. An enterprise can include several different service components or modules 702. Note that these service components or modules can be single or multiple processes and can reside internal or external to a same physical server 704. For example, the system 700 shows three types of communications components: a data media control unit (MCU) 706, an audio/video (A/V) MCU 708, and a session initiation protocol (SIP) MCU 710 for SIP communications.

Each of the components 702 that utilize per-user settings, are interested in (or choose information related to) those settings (e.g., XML) when users (U1 and/or U2) contact one of the components 702 to perform an activity. Template XML data can contain annotations that mark each setting for the one or more components 702. In system 700, the data MCU 706 can be interested in, for example, an "AllowApplicationSharing" property from a policy template, and a "MaximumSizeOfFileThatCanBeTransferred" property of a bandwidth template. The A/V MCU 708 can be interested in an "AllowIPVideo" property of the policy template and the "AllowEnhancedIPVideo" property of the bandwidth template. Similarly, the SIP Module 710 can be interested in an "AllowAdhocScheduling" property of the policy template.

The core server 704 can include the template component 102 and enforcement component 104. Additionally, the template component 102 can include a module called a template engine 712. This template engine 712 is responsible for at least distributing templates on-demand to other modules (e.g., 706, 708 and/or 710). The template engine 712 can include a well-defined interface 714 that allows other modules (e.g., 706, 708 and/or 710) to call and obtain a particular user template. At a conceptual level, for example, the engine interface 714 can look like the following:

```
interface ITemplateEngine
{
    HRESULT GetTemplate(
        [IN] USER UserIdentity,
        [IN] STRING ModuleName,
        [IN] STRING TemplateType,
        [OUT] STRING TemplateXML
    );
}
```

Each component (e.g., 706, 708 and/or 710) that is interested in getting sections of the template then uses, for example, an ITemplateInterface method to get the template instance for a particular user for a particular template type. The template engine module 712 fetches the template instance from a template data store 716, parses the template instance, and provides only sections of the template instance that are relevant to the calling module (e.g., 706, 708 and/or 710).

For example, if the A/V MCU 708 needs the bandwidth template for the user U1, the MCU 708 can call a GetTemplate method on the ITemplateEngine interface 714, passing in the following parameters:

```
userIdentity: some identity for user u1 (e.g. SID, logOnName,
emailAddress, etc)
    ModuleName: AVMCU
    TemplateType: Bandwidth
```

The template engine 712 then fetches the instance of the template (e.g., bandwidth template instance BT1) and returns only the sections of XML from that template instance that is relevant to the A/V MCU 708. In other words, all XML tags in that instance that contain A/V MCU identifiers (e.g., AVMCU as a component):

```
<TemplateInstance templateType="BandWidth" Name="BT1">
    <property name="AllowEnhancedIPVideo" component="AVMCU">
true </property>
    </TemplateInstance>
```

Based on this template definition, the A/V MCU 708 then allows the user U1 to use enhanced IP Video capabilities. Thus, the actual enforcement is done by the A/V MCU 708.

Similarly, other components (e.g., data MCU 706, SIP Module 710) can request a user template instance for any template type at any point in time. Thus, the template engine 712 is agnostic of what is being read from the template store 716. The template engine 712 knows how to read the template instances and user assignments of template instances. The engine 712 also is capable of parsing the XML from the template instance to provide relevant sections to the different corresponding modules (e.g., 706, 708 and/or 710); however, the engine 712 is oblivious of the actual content inside the template. In one implementation, the engine 712 never tries to interpret any settings within the templates; the settings are interpreted and enforced by the other components (e.g., 706, 708 and/or 710).

Note that in another implementation, a client (e.g., CLIENT$_1$, CLIENT$_2$) can utilize the ITemplateEngine interface 714 and obtain its own template instance. This can facilitate an improved user experience. For example, the client (e.g., CLIENT$_1$) can read the bandwidth setting of the user U1 using the client CLIENT$_1$ and then enable or disable a "Start Enhanced IP Video" button, for example, based on this setting. Again, to ensure security, the setting enforcement should be performed by the server components. In an alternative implementation, template enforcement can be done at either (or both) of these places: the template server (component 104) or other server/services/server components (component 706, 708 and/or 710).

Figure 8:
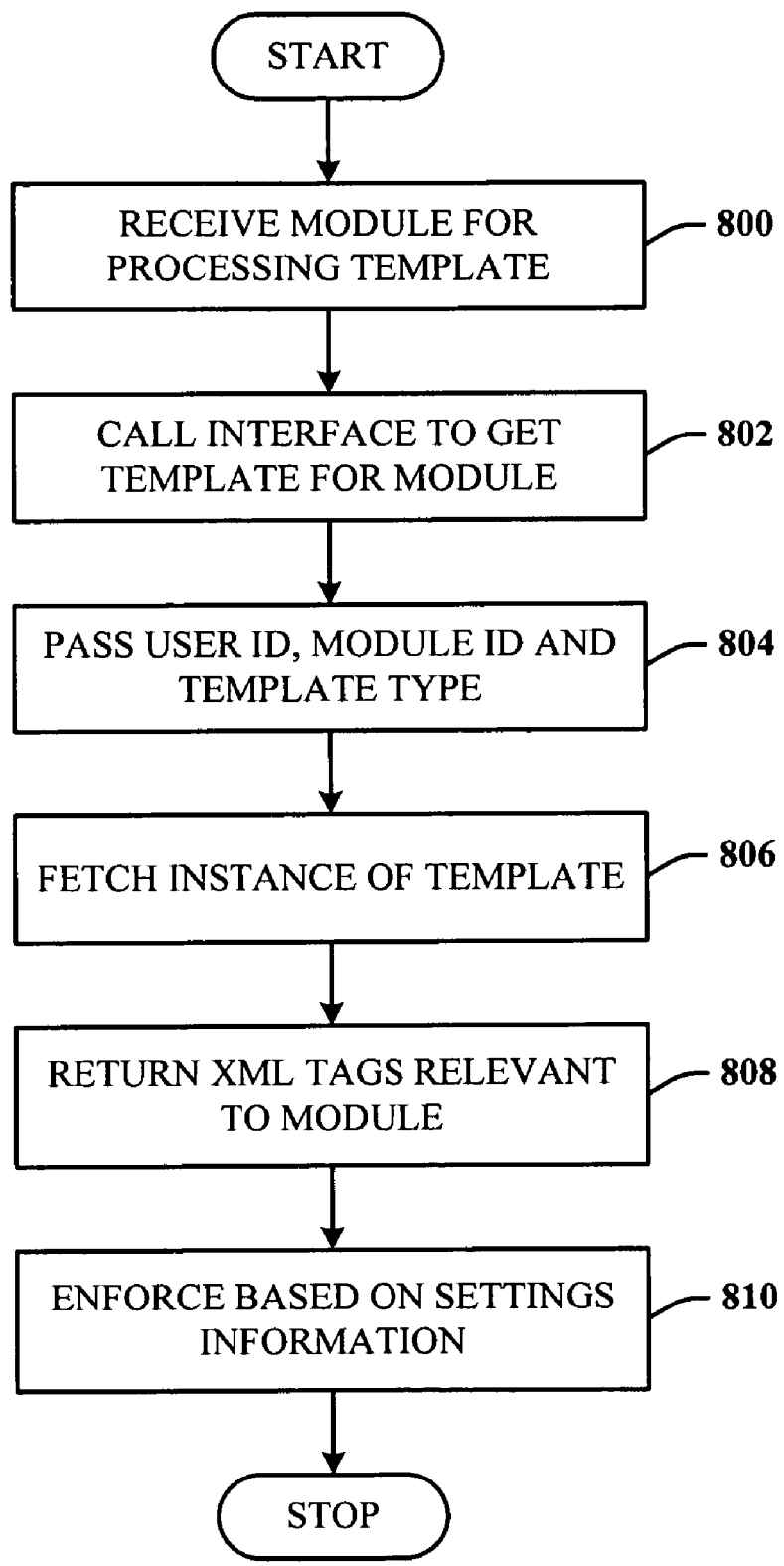
FIG. 8 illustrates a methodology of template processing by a template engine.

FIG. 8 illustrates a methodology of template processing by the template engine. At 800, a module is received for template processing. At 802, an interface is called to get the associated template module of the user. At 804, user ID, module ID and template type information can be passed to the interface. At 806, the associated template instance is fetched. At 808, the tags (e.g., XML) that match the module are returned to the module for execution. At 810, the system enforces the user (or user client) interoperability based on the settings information.

Figure 9:
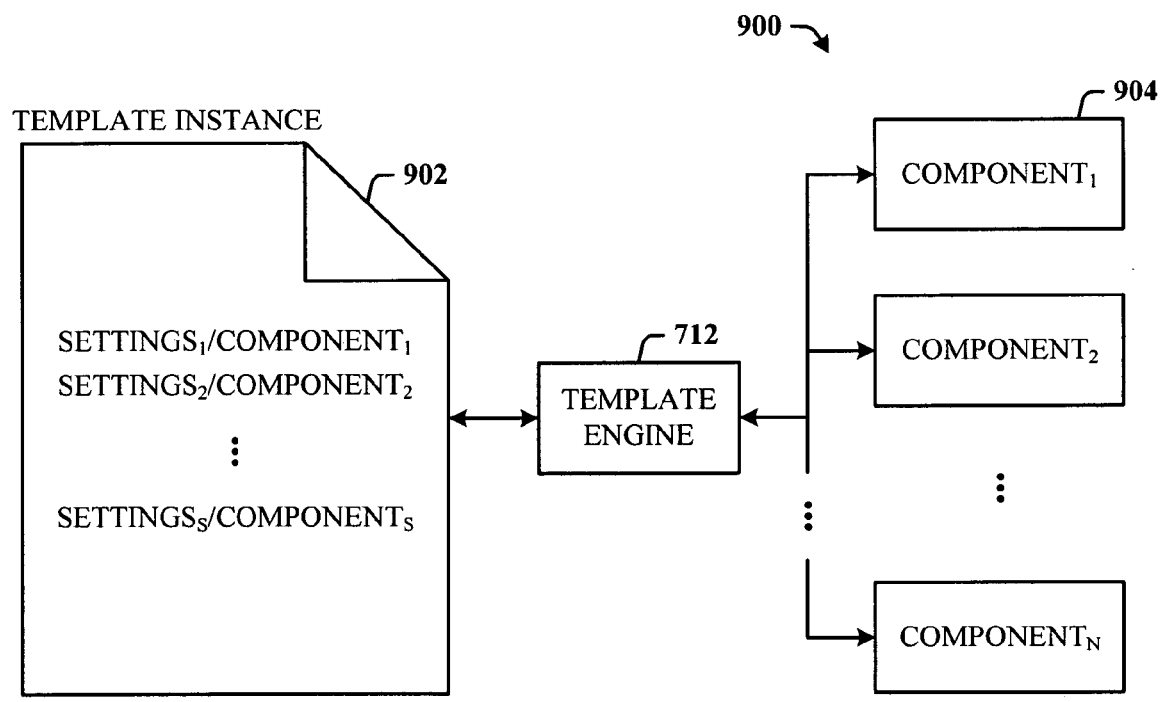
FIG. 9 illustrates a diagram of parsing a template for corresponding component settings information in accordance with the innovation.

FIG. 9 illustrates a diagram of parsing a template instance for corresponding component settings information in accordance with the innovation. The template engine 712 interfaces (directly or indirectly) to one or more components 900 (denoted COMPONENT$_1$, COMPONENT$_2$, . . . , COMPONENT$_N$, where N is a positive integer), which exemplary components 900 can include the data MCU 706, A/V MCU 708 and SIP module 710 of FIG. 7, for example. Based on the user or group, for example, the engine 712 accesses the template store (not shown) for a template instance 902 that includes one or more settings and component information (denoted SETTINGS$_1$/COMPONENT$_1$, SETTINGS$_2$/COMPONENT$_2$, . . . , SETTINGS$_S$/COMPONENT$_S$, where S is a positive integer). For a given user, the template instance 902 can include settings for operating the corresponding component 900. For example, where the user chooses to communicate via a first component (COMPONENT$_1$) 904, the engine 712 parses the instance 902 for only the corresponding tagged information SETTINGS$_1$/COMPONENT$_1$. A similar parsing and settings access operation can be performed for each of the N components, as needed. Note, however, that the instance 902 may not include settings information for the Nth component (COMPONENT$_N$), or the instance 902 can include settings information for more than the connected N components 900.

Figure 10:
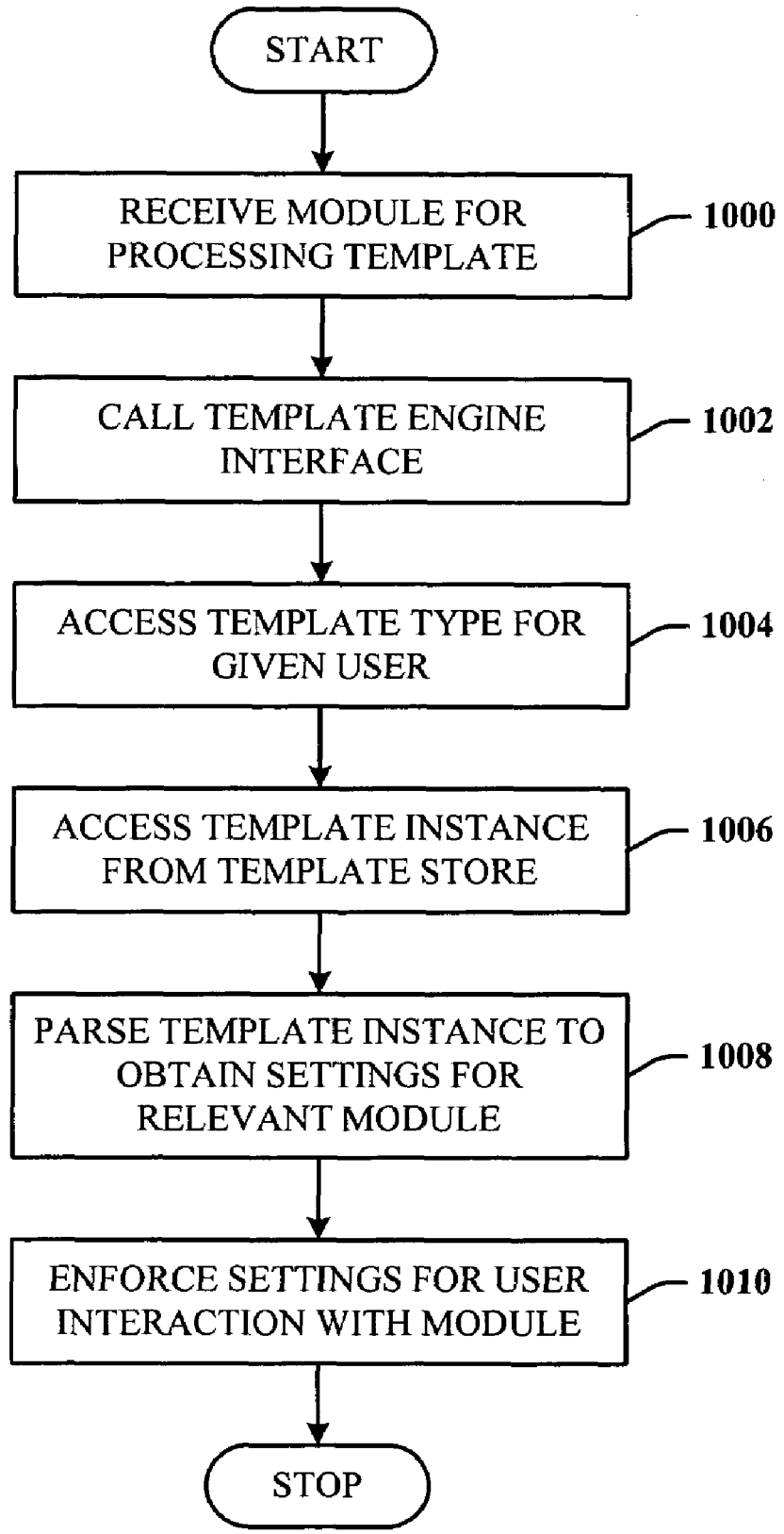
FIG. 10 illustrates an alternative methodology of template processing by the template engine.

FIG. 10 illustrates an alternative methodology of template processing by the template engine. At 1000, a module is received for template processing. At 1002, a template engine interface is called. At 1004, a template type for a given user is accessed. At 1006, the associated template instance is accessed. At 1008, the template instance is parsed for settings relevant to the module. At 1010, the settings are then enforced for user interaction via the module.

Figure 11:
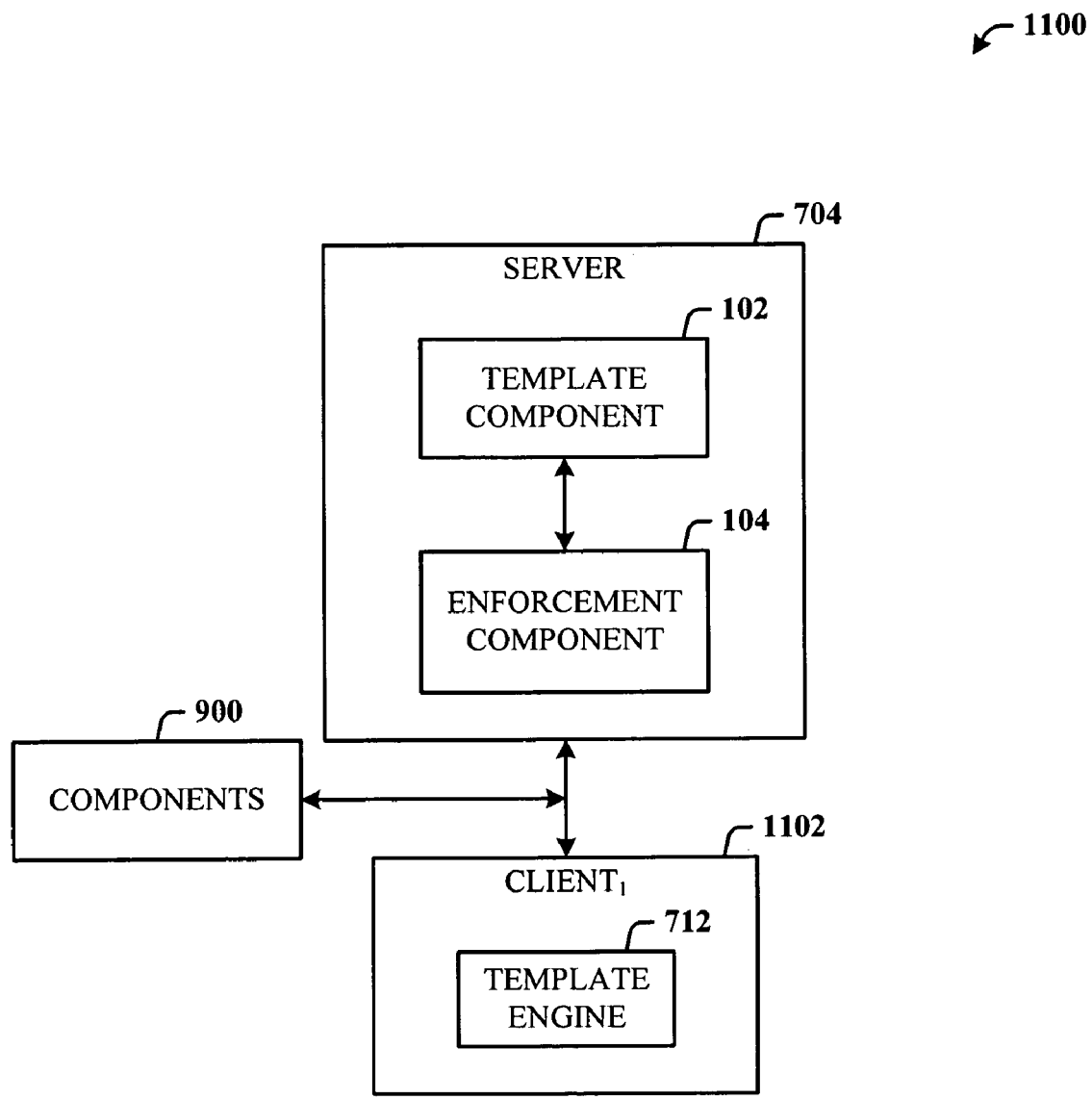
FIG. 11 illustrates an alternative system implementation where a client includes the template engine for template processing.

FIG. 11 illustrates an alternative system 1100 implementation where a client 1102 includes the template engine 712 for template processing. However, enforcement should still occur on the server 704 using the enforcement component 104. The server 704, again, can include the template component 102 and enforcement component 104. It is to be understood, however, that the client 1102 need not include the full functionality of the template engine 712, but a software agent (not shown), for example, which provides minimal functionality and communications for interacting with the server components (102 and 104). In such an implementation, the server 704 can include template engine capability (not shown) thereby providing suitable template functionality between the client 1102 and server 704.

With respect to a UI, there can be at least two ways to provide a UI for the getting/setting of the individual items of each template. Each template type has an associated schema with it (as noted above). This schema can be used to automatically generate UI for each setting in the template. For example, in the above example, the UI piece reads that the system has two types of templates: a policy template and a bandwidth template. The UI then reads the schema for each of these template types and generates a UI for the administrator to get/set the individual settings of the template. Thus, the UI need not ever know how many settings are in a template or how many template types are in the system. This provides a generic mechanism for dealing with an arbitrary number of each of the variables.

Figure 12:
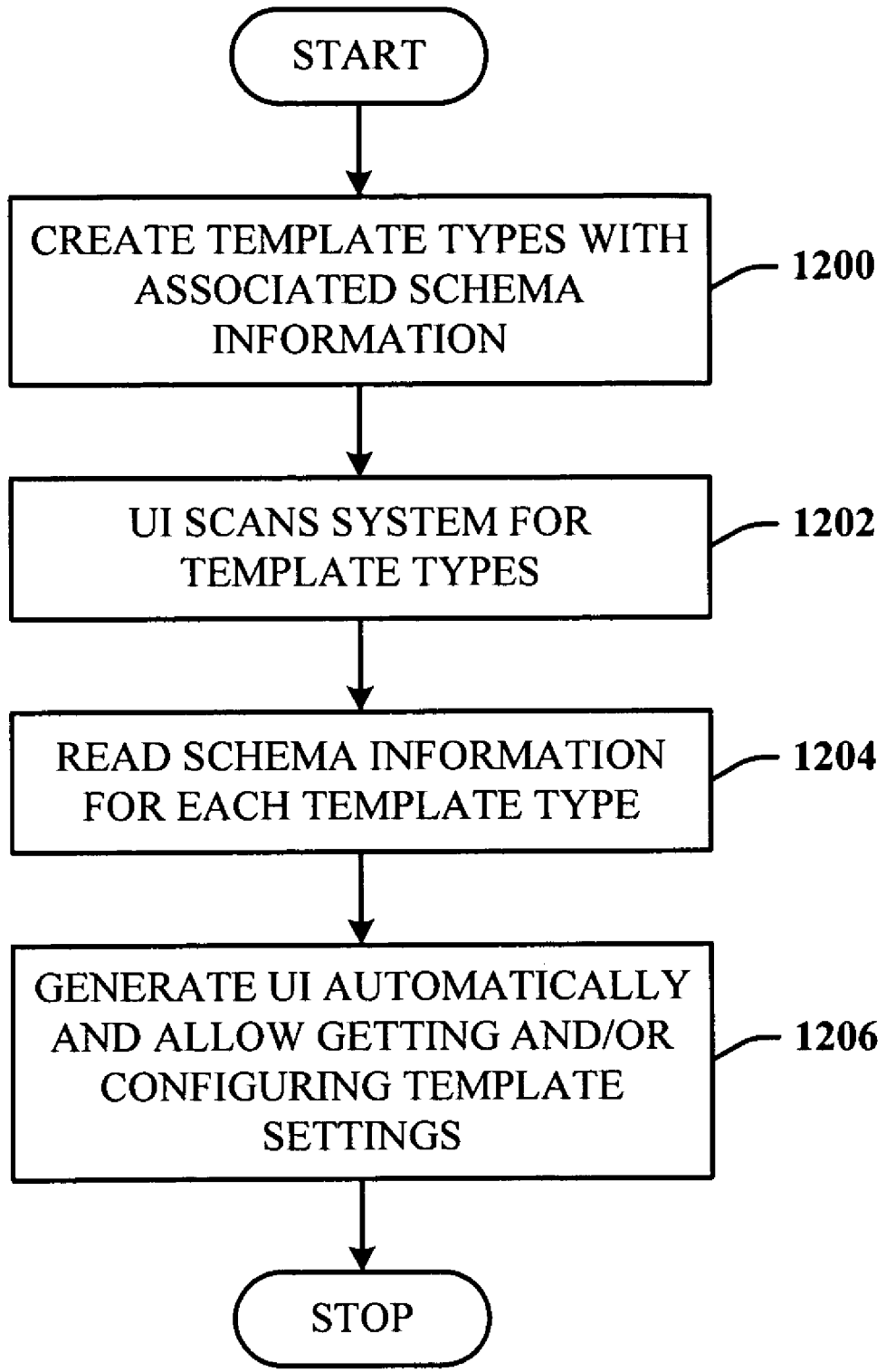
FIG. 12 illustrates a methodology for generating a UI for template processing.

FIG. 12 illustrates a methodology for generating a UI for template processing. At 1200, template types are created with associated schema information. At 1202, the UI scans the system for the template types. At 1204, the schema information is read for each template type. At 1206, the UI is automatically generated that facilitates getting and/or configuring the template settings.

Figure 13:
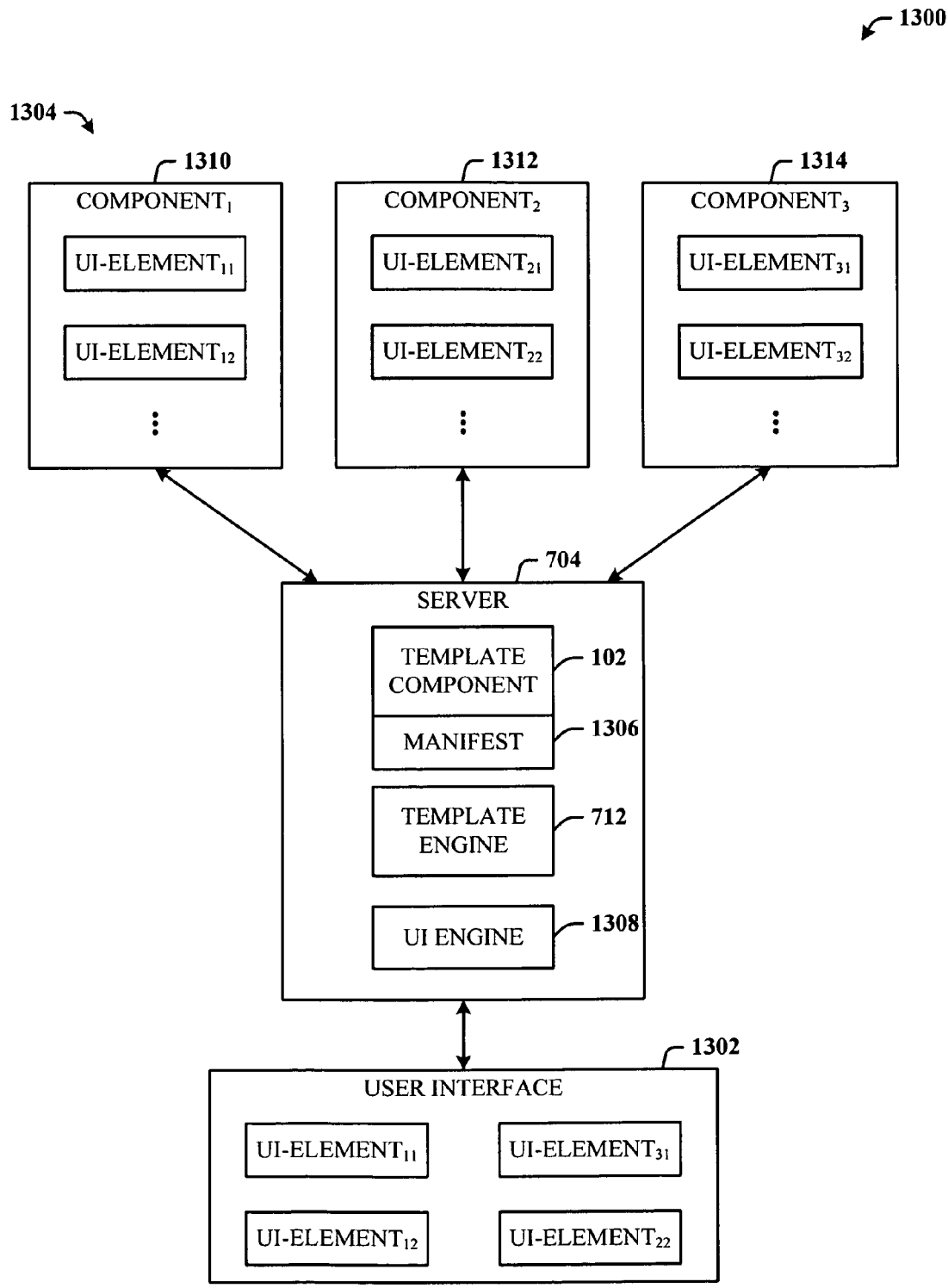
FIG. 13 illustrates an alternative system for generating a UI for template management.

FIG. 13 illustrates an alternative system 1300 for generating a UI 1302 for template management. In this particular implementation, the UI 1302 is simply a shell that hosts other smaller UI elements which are provided by individual components 1304. One way to implement this is by using HTML (hypertext markup language) and/or ASP (active server page) pages, for example. The system 1300 can include a manifest 1306 (e.g., XML-based) per template type. For example, the manifest 1306 for the Bandwidth template type include the following:

```
<TemplateInstance templateType="BandWidth">
    <property name="Component" component="DataMCU"
DisplayUI="dataMCU-bandwidth.asp"/>
    <property name="Component" component="AVMCU"
DisplayUI="avMCU-bandwidth.asp"/>
</TemplateInstance>
```

The manifest 1306 provides information to a UI engine 1308 for loading and hosting specified pages for each template type. For example, when displaying the instances of the Bandwidth template, the UI engine 1308 can call a dataMCU-bandwidth.asp page which in turn provides the administrator an option to set and change the properties associated with a first component 1310 (e.g., Data MCU) ("MaximumSizeOfFileThatCanBeTransferred" in an above example). Similarly, the UI engine 1308 can call an avMCU-bandwidth.asp page to display the properties associated with a second component 1312 (e.g., AV MCU) in the bandwidth template ("AllowEnhancedIPVideo" in the above example). Thus, individual components 1304 provide elements to the UI 1302 to get/set respective properties in each template type.

The template UI 1302 simply provides an aggregation of these smaller UI elements. Here, the UI 1302 include four elements: element UI-ELEMENT$_{11}$ (a first element from the first component 1310), element UI-ELEMENT$_{12}$ (a second element from the first component 1310), element UI-ELEMENT$_{22}$ (a second element from the second component 1312), and element UI-ELEMENT$_{31}$ (a first element from a third component 1314). Once again, the template UI 1302 is independent of the number of templates and the contents of each template. Here, the server 704 includes the template component 102 associated with which is the manifest 1306, the template engine 712, and the UI engine 1308 for automatic generation of the UI shell 1302 and some, all, or no elements of the components 1304.

As described above, one of the benefits of the disclosed innovation is the extensibility offered. As described before, per-user settings conventionally, are usually tightly coupled with the product code and thus, cannot be extended after the product code is shipped. However, there are at least two good reasons to make the architecture extensible: the product developer may need to add more per-user settings or a third-party server application writer may need to extend existing templates with custom per-user settings so that the developer does not need to bother about creating a different mechanism that could risk providing inconsistent views to the administrator. It is to be appreciated that the fact that template instances are defined and stored in XML support extensibility. Consider the following two scenarios.

Figure 14:
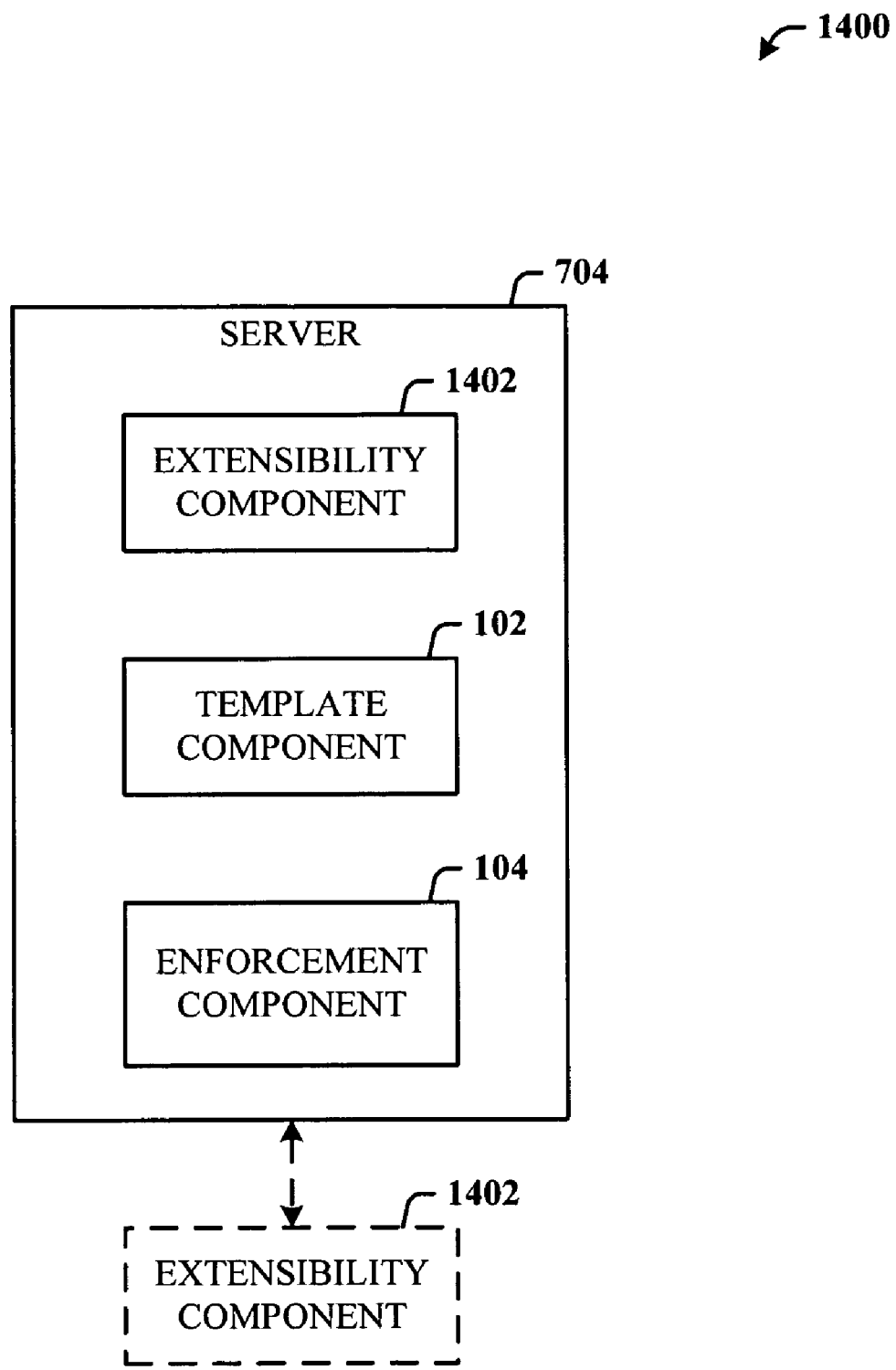
FIG. 14 illustrates an alternative system that includes an extensibility component for allowing customized template processing in accordance with the innovation.

FIG. 14 illustrates an alternative system 1400 that includes an extensibility component 1402 for allowing customized template creation and processing in accordance with the innovation. The system 1400 further can include the server 704 that has associated therewith the template component 102 and enforcement component 104. A first scenario adds new properties to existing template types. There can be a desire to add additional properties to an existing template. This may be desired by the product developer (for an existing or new server component) or a third-party vendor for a component shipped by an external partner. Assume that a third party has written a server application (using server APIs) that provides chat functionality. Then, a module (via the extensibility component 1402) may be desired to include an additional property "AllowGroupChats", for example, to a bandwidth template. In other words, the module can facilitate the following.

In a first example, the component 1402 can be utilized to extend the definition of a bandwidth template by changing the XSD (schema) file for that template type. While accomplishing this, the module should add the new property and the new component to the file. After completion, the bandwidth template instance (e.g., BT1) can look like the following:

```
<TemplateInstance templateType="BandWidth" Name="BT1">
    <property name="MaximumSizeOfFileThatCanBeTransferred"
component="DataMCU"> 1000 </property>
    <property name="AllowEnhancedIPVideo" component="AVMCU">
    true
</property>
    <property name="AllowGroupChats" component="ChatMCU"> true
</property>
</TemplateInstance>
```

In a second example, the component 1402 can be utilized to provide a module that will perform template enforcement and call a GetTemplate method of the ITemplateEngine interface for individual users to use the capabilities of this new chat module. When calling GetTemplate, the module passes in "ChatMCU" as the module name.

In a third example, the component 1402 can provide a chatMCU-bandwidth.xml that implements the UI for this new property. An ASP page can be called and loaded into the main UI for modifying/creating/deleting the bandwidth template instances by the UI engine. In order to achieve this, the UI manifest XML also should be modified. After completion, the manifest can look like this:

```
<TemplateInstance templateType="BandWidth">
    <property name="Component" component="DataMCU"
DisplayUI="dataMCU-bandwidth.asp"/>
    <property name="Component" component="AVMCU"
DisplayUI="avMCU- bandwidth.asp"/>
    <property name="Component" component="ChatMCU"
DisplayUI="chatMCU-bandwidth.asp"/>
</TemplateInstance>
```

Once completed, the bandwidth template created and customized as part of the extensibility component 1402 will automatically start providing the new property for the chat module. The template seamlessly integrated into the template storage, enforcement and management pieces.

Another scenario includes adding a new template. A new XSD file is created that defines this new template type. New UI manifests for the new template type and associated template enforcement modules and UI ASP pages (as described above) are written. Once this is done, the user objects and the global object automatically start supporting references to this new template type in the corresponding lists of template references. This can be achieved without any changes to the core template code by simply modifying XML and XSD files and providing new template enforcement and UI pieces.

Note, as illustrated, the extensibility component 1402 can be located external to the server 704, rather than internal thereto, and provide the same functionality as described above.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 15:
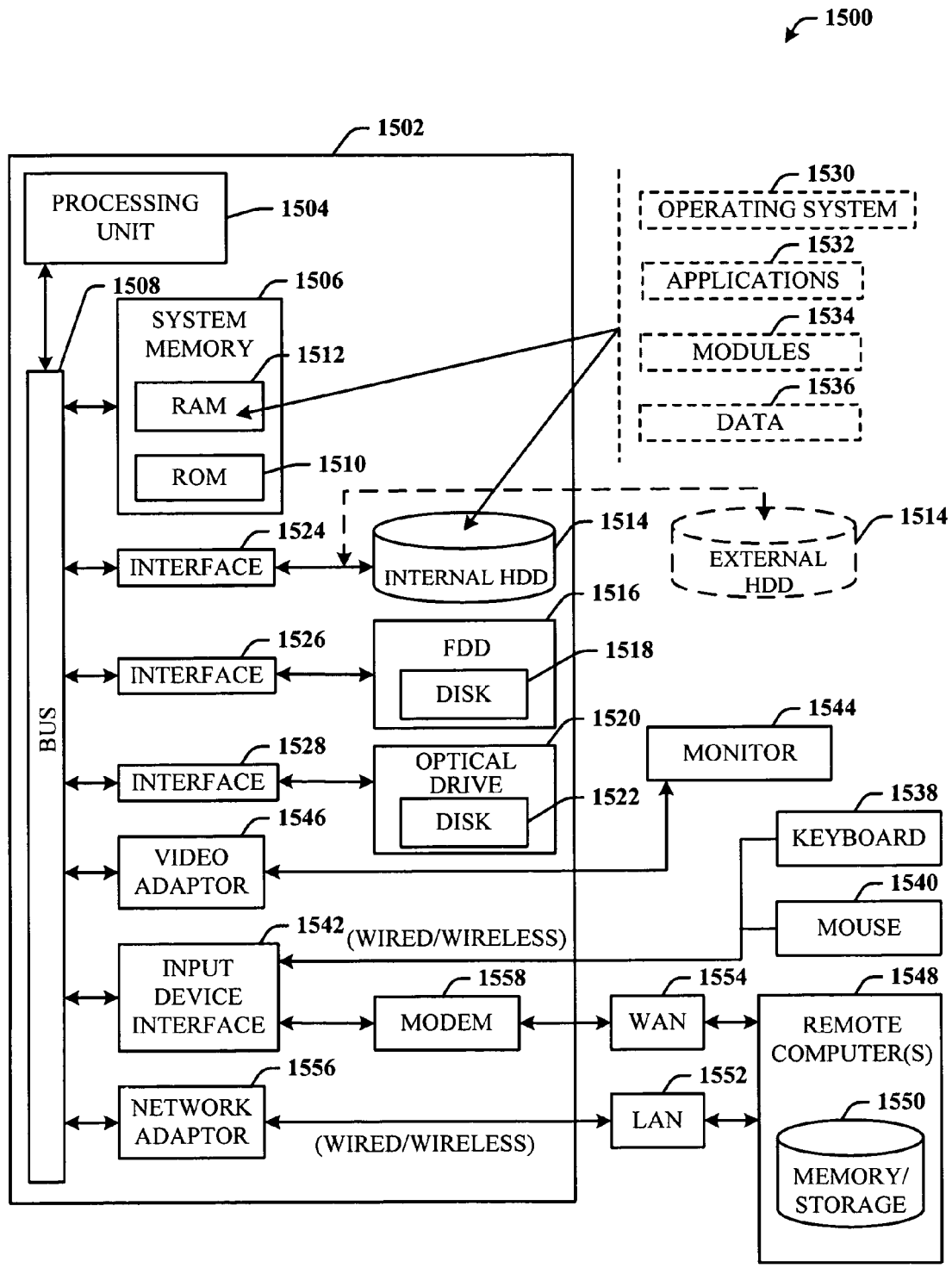
FIG. 15 illustrates a block diagram of a computing system operable to execute the disclosed extensible architecture for template-based settings management.

Referring now to FIG. 15, there is illustrated a block diagram of a computing system 1500 operable to execute the disclosed extensible architecture for template-based settings management. In order to provide additional context for various aspects thereof, FIG. 15 and the following discussion are intended to provide a brief, general description of a suitable computing system 1500 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 15, the exemplary computing system 1500 for implementing various aspects includes a computer 1502, the computer 1502 including a processing unit 1504, a system memory 1506 and a system bus 1508. The system bus 1508 provides an interface for system components including, but not limited to, the system memory 1506 to the processing unit 1504. The processing unit 1504 can be any of various commercially available processors. Dual microprocessors and other multi-processor architectures may also be employed as the processing unit 1504.

The system bus 1508 can be any of several types of bus structure that may further interconnect to a memory bus (with or without a memory controller), a peripheral bus, and a local bus using any of a variety of commercially available bus architectures. The system memory 1506 includes read-only memory (ROM) 1510 and random access memory (RAM) 1512. A basic input/output system (BIOS) is stored in a non-volatile memory 1510 such as ROM, EPROM, EEPROM, which BIOS contains the basic routines that help to transfer information between elements within the computer 1502, such as during start-up. The RAM 1512 can also include a high-speed RAM such as static RAM for caching data.

The computer 1502 further includes an internal hard disk drive (HDD) 1514 (e.g., EIDE, SATA), which internal hard disk drive 1514 may also be configured for external use in a suitable chassis (not shown), a magnetic floppy disk drive (FDD) 1516, (e.g., to read from or write to a removable diskette 1518) and an optical disk drive 1520, (e.g., reading a CD-ROM disk 1522 or, to read from or write to other high capacity optical media such as the DVD). The hard disk drive 1514, magnetic disk drive 1516 and optical disk drive 1520 can be connected to the system bus 1508 by a hard disk drive interface 1524, a magnetic disk drive interface 1526 and an optical drive interface 1528, respectively. The interface 1524 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1502, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. It is to be appreciated that the innovation can be implemented with various commercially available operating systems or combinations of operating systems. The one or more application programs 1532, other program modules 1534 and program data 1536 can include one or more of the template component, enforcement component, template engine, extensibility component and interfaces, for example, described herein.

A user can enter commands and information into the computer 1502 through one or more wired/wireless input devices, for example, a keyboard 1538 and a pointing device, such as a mouse 1540. Other input devices (not shown) may include a microphone, an IR remote control, a joystick, a game pad, a stylus pen, touch screen, or the like. These and other input devices are often connected to the processing unit 1504 through an input device interface 1542 that is coupled to the system bus 1508, but can be connected by other interfaces, such as a parallel port, an IEEE 1394 serial port, a game port, a USB port, an IR interface, etc.

A monitor 1544 or other type of display device is also connected to the system bus 1508 via an interface, such as a video adapter 1546. In addition to the monitor 1544, a computer typically includes other peripheral output devices (not shown), such as speakers, printers, etc.

The computer 1502 may operate in a networked environment using logical connections via wired and/or wireless communications to one or more remote computers, such as a remote computer(s) 1548. The remote computer(s) 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wired/wireless connectivity to a local area network (LAN) 1552 and/or larger networks, for example, a wide area network (WAN) 1554. Such LAN and WAN networking environments are commonplace in offices and companies, and facilitate enterprise-wide computer networks, such as intranets, all of which may connect to a global communications network, for example, the Internet.

When used in a LAN networking environment, the computer 1502 is connected to the local network 1552 through a wired and/or wireless communication network interface or adapter 1556. The adaptor 1556 may facilitate wired or wireless communication to the LAN 1552, which may also include a wireless access point disposed thereon for communicating with the wireless adaptor 1556.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wired or wireless device, is connected to the system bus 1508 via the serial port interface 1542. In a networked environment, program modules depicted relative to the computer 1502, or portions thereof, can be stored in the remote memory/storage device 1550. It will be appreciated that the network connections shown are exemplary and other means of establishing a communications link between the computers can be used.

The computer 1502 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Figure 16:
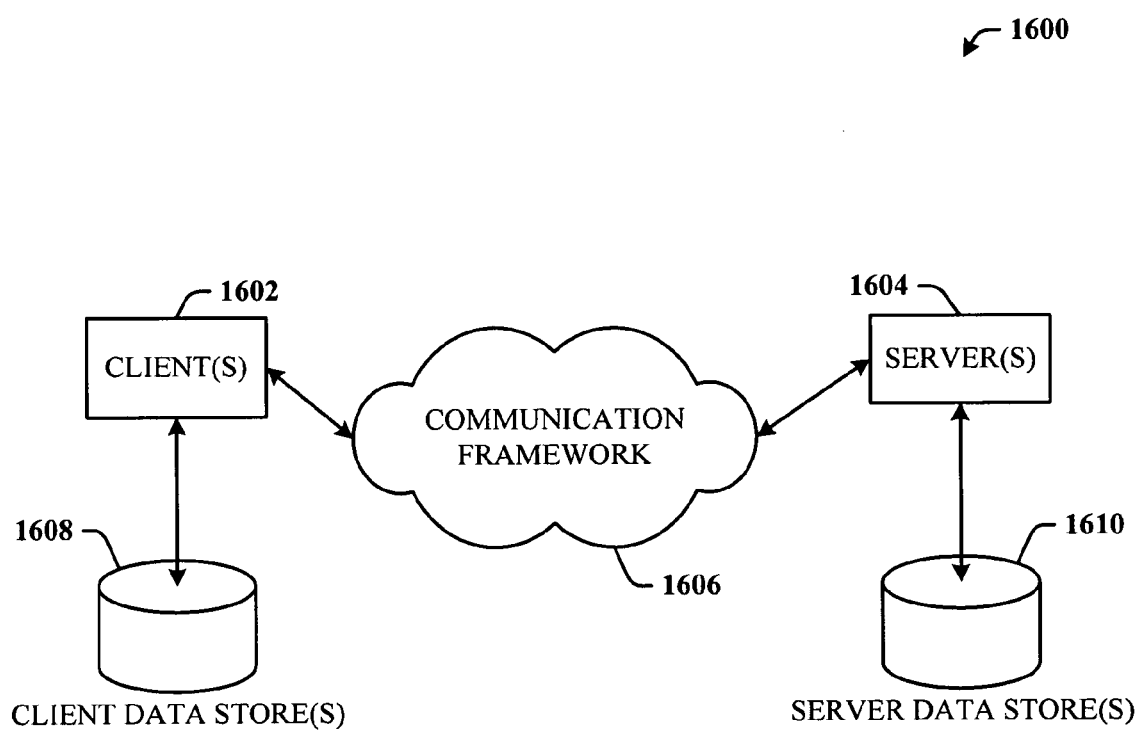
FIG. 16 illustrates a schematic block diagram of an exemplary computing environment for the disclosed extensible architecture for template-based settings management.

Referring now to FIG. 16, there is illustrated a schematic block diagram of an exemplary computing environment 1600 for the disclosed extensible architecture for template-based settings management. The system 1600 includes one or more client(s) 1602. The client(s) 1602 can be hardware and/or software (e.g., threads, processes, computing devices). The client(s) 1602 can house cookie(s) and/or associated contextual information by employing the subject innovation, for example.

The system 1600 also includes one or more server(s) 1604. The server(s) 1604 can also be hardware and/or software (e.g., threads, processes, computing devices). The servers 1604 can house threads to perform transformations by employing the architecture, for example. One possible communication between a client 1602 and a server 1604 can be in the form of a data packet adapted to be transmitted between two or more computer processes. The data packet may include a cookie and/or associated contextual information, for example. The system 1600 includes a communication framework 1606 (e.g., a global communication network such as the Internet) that can be employed to facilitate communications between the client(s) 1602 and the server(s) 1604.

Communications can be facilitated via a wired (including optical fiber) and/or wireless technology. The client(s) 1602 are operatively connected to one or more client data store(s) 1608 that can be employed to store information local to the client(s) 1602 (e.g., cookie(s) and/or associated contextual information). Similarly, the server(s) 1604 are operatively connected to one or more server data store(s) 1610 that can be employed to store information local to the servers 1604.

The server(s) 1604 can include the template component, enforcement component, template engine, and interface, for example, for interacting with template creation and processing, for example. The server(s) 104 can also include the AV MCU, data MCU components and SIP module (706, 708 and 710) as well as the UI Engine 1308. The data store 1610 can be the template repository.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system that facilitates configuration management, comprising:
    a template component for defining a template that includes a per-user setting associated with a system application;
    a template assignment tool configured to assign an instance of the template to one or more users;
    an enforcement component for enforcing the per-user setting via the template;
    an extensibility component configured to enable a definition of the template to be extended by a third-party; and
    a communications component for at least one of media or messaging communications, which communications component accesses the template for a per-user setting for configuring the communications component.

2. The system of claim 1, wherein the enforcement component enforces the per-user setting on a server.

3. The system of claim 1, wherein the per-user setting is defined as a logical grouping.

4. The system of claim 3, wherein the grouping is associated with a category of employee, geography, user location, or network characteristic.

5. The system of claim 1, wherein the template is defined in a declarative format.

6. The system of claim 1, wherein the template has multiple instances.

7. The system of claim 1, wherein the template is a type associated with a policy, bandwidth, topology discovery, or security.

8. The system of claim 1, further comprising a template engine for distributing the templates on-demand to other modules.

9. The system of claim 1, wherein the template includes settings for multiple components.

10. A computer-implemented method of managing configuration settings, comprising:
    creating a template of per-user settings for a category of user using one or more processors, the template being associated with a system application;
    adding new properties to the template;
    adding new template types into an existing system;
    instantiating the template into one or more template instances;
    enabling a definition of the template to be extended by a third-party;
    applying values to settings of the one or more template instances; and
    assigning the one or more instances to users.

11. The method of claim 10, further comprising creating a global template instance that assigns a global setting to the users.

12. The method of claim 10, further comprising enforcing the template on a server.

13. The method of claim 10, further comprising associating a list of template instance references of the template with a user object.

14. The method of claim 13, wherein each element of the list includes a reference to a template instance and template type from which the template instance is instantiated.

15. The method of claim 10, further comprising providing a list of global settings that contain references to an instance of a template type.

16. The method of claim 10, further comprising parsing the settings of the template related to a communications module for operating the communications module according to the per-user settings of the user.

17. The method of claim 10, further comprising generating a user interface for automatically presenting elements transmitted from one or more service modules.

18. A computer-implemented system, comprising:

computer-implemented means for creating a template of per-user settings for a category of user using one or more processors, the template being associated with a system application;

computer-implemented means for defining the template in a declarative format;

computer-implemented means for instantiating the template into one or more template instances;

computer-implemented means for parsing one of the template instances for module settings of a module;

computer-implemented means for enabling a definition of the template to be extended by a third-party;

computer-implemented means for communicating the settings to the module for interaction by a client of the user; and computer-implemented means for enforcing the template.

* * * * *